(12) United States Patent
Katou

(10) Patent No.: US 9,410,048 B2
(45) Date of Patent: Aug. 9, 2016

(54) ANTIFOULING FILM, AIR BLOWER BLADE PROVIDED WITH SAME, AIR BLOWER, AND ANTIFOULING COATING MATERIAL

(75) Inventor: Ryou Katou, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 662 days.

(21) Appl. No.: 13/979,442

(22) PCT Filed: Mar. 5, 2012

(86) PCT No.: PCT/JP2012/001492
§ 371 (c)(1),
(2), (4) Date: Jul. 12, 2013

(87) PCT Pub. No.: WO2012/144121
PCT Pub. Date: Oct. 26, 2012

(65) Prior Publication Data
US 2013/0294926 A1  Nov. 7, 2013

(30) Foreign Application Priority Data

Apr. 22, 2011  (JP) .................................. 2011-095773

(51) Int. Cl.
| | | |
|---|---|---|
| C09D 5/16 | (2006.01) | |
| C09D 123/26 | (2006.01) | |
| F04D 29/28 | (2006.01) | |
| C09D 5/24 | (2006.01) | |
| C09D 7/12 | (2006.01) | |
| C09D 127/18 | (2006.01) | |
| F01D 5/28 | (2006.01) | |
| C09C 1/56 | (2006.01) | |

(52) U.S. Cl.
CPC ................ *C09D 5/1687* (2013.01); *C09C 1/56* (2013.01); *C09D 5/1618* (2013.01); *C09D 5/1662* (2013.01); *C09D 5/24* (2013.01); *C09D 7/1266* (2013.01); *C09D 123/26* (2013.01); *C09D 127/18* (2013.01); *F01D 5/288* (2013.01); *F04D 29/281* (2013.01); *F05C 2253/12* (2013.01); *Y10T 428/3154* (2015.04)

(58) Field of Classification Search
CPC .. C09D 5/1687; C09D 5/1618; C09D 7/1266; C09D 5/1662; C09D 5/24; C09D 127/18; C09D 123/26; C09C 1/56; Y10T 428/3154; F01D 5/288; F01D 5/286; F01D 25/007; F05D 2230/90; F04D 29/281; F05C 2253/12; C08K 3/04; C08L 23/26; C08L 71/02
USPC ........... 416/241 A; 106/1.05, 18.35; 424/409, 424/78.18; 428/421; 524/401, 546, 408, 524/409, 410
See application file for complete search history.

(56) References Cited

U.S. PATENT DOCUMENTS

| | | |
|---|---|---|
| 5,034,460 A | 7/1991 | Nishioka |
| 2010/0095697 A1 | 4/2010 | Morioka |

FOREIGN PATENT DOCUMENTS

| | | |
|---|---|---|
| EP | 2 223 962 A1 | 9/2010 |
| JP | 4722456 B1 | 6/1972 |

(Continued)

OTHER PUBLICATIONS

International Search Report for PCT/JP2012/001492 dated May 22, 2012.
Japanese Office Action for Application No. JP 2013-510851 dated Jan. 5, 2016.

*Primary Examiner* — Igor Kershteyn
*Assistant Examiner* — Aaron R Eastman
(74) *Attorney, Agent, or Firm* — Pearne & Gordon LLP

(57) ABSTRACT

An antifouling film is coated on a base, and contains a binder component, conductive particles, and a fluororesin. The conductive particles are bound together by the binder component; the binder component is closely bound to the base; and the antifouling film has a comprising the conductive particles of which surfaces are covered with the fluororesin.

9 Claims, 5 Drawing Sheets

(56) References Cited

FOREIGN PATENT DOCUMENTS

| | | | |
|---|---|---|---|
| JP | 60-123566 A | 7/1985 |
| JP | 01-304143 A | 12/1989 |
| JP | 02-120350 A | 5/1990 |
| JP | 02-292349 A | 12/1990 |
| JP | 06-322313 A | 11/1994 |
| JP | 7-119102 B2 | 12/1995 |
| JP | 11-323241 A | 11/1999 |
| JP | 2003-246961 A | 9/2003 |
| JP | 2005-239929 A | 9/2005 |
| JP | 2009-024145 A | 2/2009 |
| JP | 2009/072299 A1 | 6/2009 |
| JP | 2009-138093 A | 6/2009 |
| JP | 2010-096437 A | 4/2010 |
| WO | 2006/134808 A1 | 12/2006 |

ANTIFOULING FILM, AIR BLOWER BLADE PROVIDED WITH SAME, AIR BLOWER, AND ANTIFOULING COATING MATERIAL

TECHNICAL FIELD

The present invention relates to an antifouling film, air blower blades coated with the film, an air blower, and an antifouling coating material.

BACKGROUND ART

Conventional antifouling films known to have antifouling properties include a coating film shown in Patent Literature 1. The coating film will now be described with reference to FIG. 7. In the following description, the term "attached" is defined as a state where contaminants such as dust are in contact with a surface. The term "adhered" is defined as a state where contaminants are stuck to the surface. The term "antifouling" is defined as the ability to prevent contaminants from being attracted, attached, or adhered.

FIG. 7 is a configuration of a coating film as the conventional antifouling film. In FIG. 7, coating film 101 is coated on object 106 to be coated, which is made of plastic such as polystyrene or polypropylene. Coating film 101 is composed of silica film 102 having a smooth surface and containing silica microparticles 104; and fluororesin particles 103, which are half buried and half exposed on silica film 102. Silica microparticles 104 of silica film 102 have a particle size of 4 nm to 15 nm, whereas fluororesin particles 103 have a particle size of 50 nm to 500 nm. Hydrophilic silica film 102 conducts some electricity, thereby providing an antistatic effect to dissipate electric charges accumulated on its surface. Hence, silica film 102 can prevent dust from being attracted and attached to its surface due to electric charges.

Silica film 102 can prevent dust attachment also because it has a smooth surface with no projections-and-recesses in which dust may be caught. In addition, coating film 101 has fluororesin particles 103 sticking out of its surface, so that the surface area of silica film 102 is not large enough for hydrophilic dust such as sand to adhere. Fluororesin particles 103 are composed of fluorine atoms and carbon atoms bonded into molecules. The bonding orbitals of the fluorine atoms are filled with paired electrons. Hence, the fluorine atoms do not combine with other substances, allowing fluororesin particles 103 to have an inert surface. This prevents adhesion of not only hydrophilic dust such as sand, but also hydrophobic dust such as carbon and soot. Furthermore, coating film 101 contains oxidizing agent 105, which functions to improve the intimate contact between coating film 101 and object 106 to be coated.

Coating film 101 shown in Patent Literature 1 has projections and recesses intentionally formed by making fluororesin particles 103 stick out of the smooth surface. Coating film 101 with a smooth surface has a surface area large enough for dust to be attached. To obtain higher antifouling properties, it is necessary to minimize the surface area to which dust may be attached, and to make attached dust afloat.

The dust-attracting action can be reduced by quickly dissipating electric charges from coating film 101, but the problem is that its conductivity is not high enough for that.

The intimate contact between coating film 101 and object 106 to be coated is improved by the function of the oxidizing agent. When washed with water, however, coating film 101 is dissolved in water and disappears because silica microparticles 104 of coating film 101 are hydrophilic. This causes a reduction in the antifouling properties until they are finally lost.

CITATION LIST

Patent Literature

Patent Literature 1; Japanese Unexamined Patent Publication No. 2010-96437

SUMMARY OF THE INVENTION

The antifouling film of the present invention is coated on a base, and contains a binder component, conductive particles, and a fluororesin. The conductive particles are bound together by the binder component; the binder component is closely bound to the base; and the antifouling film has a surface comprising the conductive particles of which surfaces are covered with the fluororesin.

The surfaces of the conductive particles are exposed on the surface of the antifouling film, and have fine projections and recesses covered with the fluororesin. This allows dust to be attached only to a small area, the tips of the projections.

Even if attached, dust is made afloat by the fluororesin, and can easily come off. Since the surfaces of the conductive particles are coated with the fluororesin, the openings of the recesses are covered with the fluororesin, thereby preventing the entry of dust therethrough.

As another advantage, the antifouling film has high conductivity due to the conductive particles contained therein. This quickly dissipates the accumulated electric charges, preventing dust from being attracted. As still another advantage, the antifouling film is insoluble in water because the binder component, which is brought closely bound to the base, is insoluble in water. This prevents the antifouling film from being dissolved in water when washed, thus maintaining its antifouling properties semi-permanently.

DESCRIPTION OF EMBODIMENT

An exemplary embodiment of the present invention will now be described with reference to drawings.

Exemplary Embodiment

Figure 1:
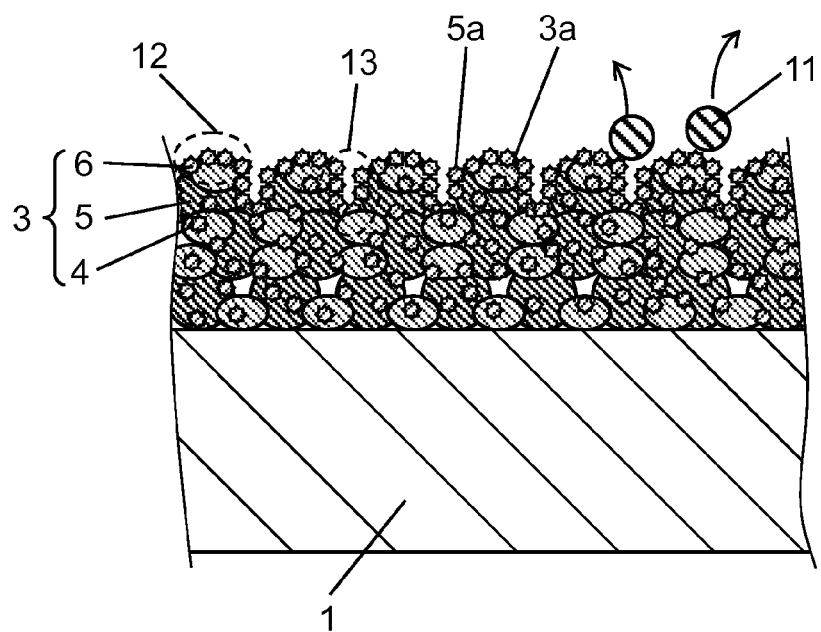
FIG. 1 is a partial sectional view of an antifouling film according to an exemplary embodiment of the present invention.
Figure 2:
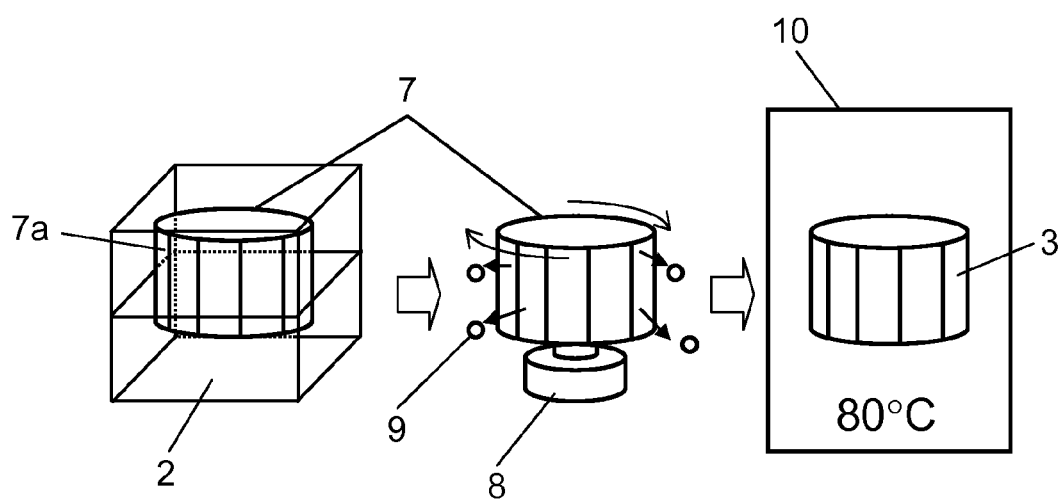
FIG. 2 shows how the antifouling film is applied to air blower blades.

FIG. 1 is a partial sectional view of an antifouling film according to the exemplary embodiment of the present invention, and FIG. 2 shows how the antifouling film is applied to air blower blades. For easier understanding, in FIG. 1, antifouling film 3 is shown only on the top surface of base 1. As shown in FIG. 1, antifouling film 3 is coated on base 1. Base 1 can be made of metal, plastic, paper, or other material. In the first exemplary embodiment of the present invention, base 1 is made of polypropylene having an inert surface, so that it is difficult to fix antifouling film 3 on base 1. Antifouling coating material 2 from which antifouling film 3 is made, is now described with reference to FIGS. 1 and 2.

Antifouling coating material 2 using water as a solvent contains unsaturated carboxylic acid-modified polyolefin resin (hereinafter, UCA modified PO) 4 as a binder component, carbon black particles 5 as conductive particles, and fluororesin 6.

UCA modified PO 4 has the property of binding strongly to polypropylene. One specific example of UCA modified PO 4 is maleic anhydride-modified chlorinated polypropylene made by polymerizing polypropylene in which the hydrogen has been replaced by chlorine with maleic anhydride, which is an unsaturated carboxylic acid. Another specific example of UCA modified PO 4 is maleic anhydride acrylic modified polypropylene made by polymerizing polypropylene, methacrylamide derivative, acrylamide derivative, and maleic anhydride. The methacrylamide derivative and acrylamide derivative can be, for example, diacetone acrylamide, N,N-diethylmethacrylamide or N,N-diethylacrylamide. UCA modified PO 4 is surrounded by a surfactant such as polyoxy ethylene alkyl ether, and is uniformly dispersed in water as a solvent.

Carbon black particles 5, which are made of carbon atoms, are microscopic particles with a diameter of 10 nm to 100 nm. Just like UCA modified PO 4, carbon black particles 5 are surrounded by a surfactant such as polyoxy ethylene alkyl ether, and is uniformly dispersed in water.

A representative example of fluororesin 6 is a mixture of a fluoroethylene-vinyl ether alternating copolymer resin (hereinafter, the FEVE resin) and a perfluoro alkyl group-ethylene oxide copolymer (hereinafter, the RFEO resin). The FEVE resin has a molecular structure where fluoroethylene and vinyl ether are arranged in an alternating sequence so that properties of both can be exhibited in a balanced manner. Fluoroethylene enables the surface to be chemically inert. Vinyl ether enables to be soluble and dispersible in a solvent. Vinyl ether also improves the connectivity of the binder component and carbon black particles 5, or the flexibility. As another advantageous feature, the FEVE resin is unlikely to be damaged by ultraviolet exposure because of its structure where vinyl ether susceptible to ultraviolet light is sandwiched by fluoroethylene resistant to ultraviolet light.

The RFEO resin, on the other hand, functions as a surfactant to promote solubilization of the FEVE resin in water. A perfluoro alkyl group has a structure where all the hydrogen atoms in the alkyl group have been replaced by fluorine atoms. The perfluoro alkyl group used here has a short-chain structure with 6 carbon atoms and 13 fluorine atoms, which is considered not to remain in the human body.

The perfluoro alkyl group in the RFEO resin and the fluoroethylene in the FEVE resin weakly attract each other. The ethylene oxide in the RFEO resin hydrogen-bonds to water so as to allow to be dispersed in water as a solvent. As a result, fluororesin 6 is stably dispersed in water as a solvent.

As described above, antifouling coating material 2 is a liquid including UCA modified PO 4 as a binder component, carbon black particles 5, and fluororesin 6 which are uniformly mixed and dispersed in water. Antifouling coating material 2 is applied to base 1, and then dried, thereby providing antifouling film 3 on base 1.

As shown in FIG. 1, antifouling film 3 includes UCA modified PO 4 and countless carbon black particles 5 bound together by UCA modified PO 4. Antifouling film 3 is bonded and is closely bound to base 1 made of polypropylene by UCA modified PO 4.

Carbon black particles 5 with a diameter of 10 nm to 100 nm are exposed on film surface 3$a$ of antifouling film 3, thereby providing fine projections and recesses on film surface 3$a$. Carbon black particles 5 exposed on film surface 3$a$ have particle surfaces 5$a$. Particle surfaces 5$a$ have fluororesin 6 adhered thereon by the adhesive action of UCA modified PO 4, thereby being provided with the chemical inertness of fluororesin 6. Thus, fluororesin 6 covers particle surfaces 5$a$ of carbon black particles 5 on film surface 3$a$.

Carbon black particles 5 are composed of covalently-bonded carbon atoms. The electrons not covalently bonded move freely from carbon atom to carbon atom, thereby providing conductivity. Antifouling film 3, which contains a sufficient amount of carbon black particles 5, has high conductivity corresponding to a surface resistivity of 103 SZ/sq to 104 SZ/sq, and the property of quickly dissipating accumulated electric charges. Thus, antifouling film 3 does not become electrically charged, indicating not to attract dust 11.

Dust 11 comes into contact only with the tips of projections 12, which are too small an area for dust 11 to be attached easily. More specifically, dust 11 generally has a size of not less than 100 nm, which is too large to fit into the spaces between carbon black particles 5 with a diameter of 10 nm to 100 nm and covered with fluororesin 6. Thus, the attachment of dust 11 can be prevented.

Furthermore, particle surfaces 5$a$ of carbon black particles 5 are coated with fluororesin 6, which is not bonded to other substances because of its chemical inertness. As a result, even if attached to fluororesin 6, dust 11 is made afloat on the tips of projections 12, and can soon come off.

The openings of recesses 13 are closed by fluororesin 6 so as not to allow dust 11 to enter recesses 13. As a result, dust 11 is made afloat on recesses 13 and comes off soon. Thus, antifouling film 3 does not allow dust 11 to be attracted or attached, and makes dust 11 come off easily when attached, indicating high antifouling properties.

Although not shown in FIG. 1, the process of drying antifouling coating material 2 removes the surfactant surrounding each of UCA modified PO 4, carbon black particles 5, and fluororesin 6. As a result, UCA modified PO 4, carbon black particles 5, and fluororesin 6 are bound together to be formed into antifouling film 3. Once formed, antifouling film 3 is insoluble in water. In other words, UCA modified PO 4, carbon black particles 5, and fluororesin 6 contained in antifouling film 3 do not elute. Thus, no matter how often antifouling film 3 is washed with water, the antifouling properties of antifouling film 3 can be maintained semi-permanently.

Although not shown in FIG. 1, antifouling film 3 cannot be made uniform by applying an aqueous solution having UCA modified PO 4 dispersed therein on base 1 and drying it, and then applying an aqueous solution having carbon black particles 5 and fluororesin 6 dispersed therein, and drying it. This is because the film made of UCA modified PO 4 only has a low affinity for the aqueous solution having carbon black particles 5 and fluororesin 6 dispersed therein, thereby repelling each other at their interface.

In order to obtain antifouling film 3 that has been applied uniformly and that is closely bound to base 1, UCA modified PO 4 needs to be uniformly dispersed in antifouling film 3. For this reason, antifouling coating material 2 to be applied to base 1 and dried needs to be made from an aqueous solution having UCA modified PO 4, carbon black particles 5, and fluororesin 6 all of which are uniformly mixed and dispersed therein.

Antifouling film 3 is formed on base 1 by applying antifouling coating material 2 and drying it one time each. In order to evaluate the antifouling properties of antifouling film 3, an on-board remaining dust test was performed as follows. First, 3 g of JIS Test Powders 1, class 5 (fly ash containing 84±5 wt % of dust 11 with a particle size of not less than 5 μm) was placed on a polypropylene board of 100 mm square with a thickness of 0.5 mm, and was spread into a circle having a diameter of about 80 mm. Next, the polypropylene board was placed upside down, and weighted to measure the amount of dust left on a polypropylene board (hereinafter referred to as the on-board dust amount). Thus, dust 11 left on each sample was evaluated.

One of the polypropylene board samples used in this test was a non-treated board that is coated with nothing. Another one was a board sample A prepared according to Patent Literature 1. The board sample A was prepared by applying a coating solution (Patent Literature 1 coating solution) to a board sample and drying it at 80° C. This coating solution is composed of the following components: 5 wt % of Snow Tex (manufactured by Nissan Chemical Industries, Ltd.) containing 30 wt % of silica microparticles; 0.8 wt % of PTFE dispersion (manufactured by Asahi Glass Company) containing 60 wt % of fluororesin 6; 0.1 wt % of a nonionic surfactant, Color-Sperse 188-A (manufactured by San Nopco Limited) as a dispersant; 3 wt % of an aqueous solution containing 30 wt % of hydrogen peroxide in order to improve closely bound; and 91.1% of water.

In addition, the following three types of solutions were prepared. A first type was an aqueous solution having, as a kind of UCA modified PO 4, maleic anhydride-modified chlorinated polypropylene dispersed therein with a surfactant (manufactured by Nippon Paper Industries Co., Ltd. and hereinafter referred to as the chlorinated PP aqueous solution). A second type was an aqueous solution having carbon black particles 5 dispersed therein with a surfactant (manufactured by Lion Corporation, and hereinafter referred to as the CB aqueous solution). A third type was an aqueous solution having the FEVE resin and the RFEO resin that are mixed and dispersed therein (manufactured by AGC Seimi Chemical Co., Ltd., and hereinafter referred to as the fluororesin aqueous solution). These three types of aqueous solutions were mixed to form antifouling coating material 2, applied to the polypropylene board as base 1, and dried at 80° C. Board samples B to H were prepared by being coated with antifouling film 3 containing UCA modified PO 4 (in this test, maleic anhydride-modified chlorinated polypropylene), carbon black particles 5, and fluororesin 6 in the weight ratios shown in Table 1. Table 1 shows the measurement results of the nine samples.

TABLE 1

| board sample | the weight ratio of antifouling film components (—) ||| on-board remaining dust (mg) | the number of peeled squares |
|---|---|---|---|---|---|
| | UCA modified PO 4 | carbon black particles 5 | fluororesin 6 surface resistivity (Ω/sq) | | |
| non-treated board | 0 | 0 | 0   $1 \times 10^{15}$ | 26.3 | — |
| A | — | — | —   $2 \times 10^{12}$ | 1.5 | — |
| B | 1 | 0.55 | 0.37   $1 \times 10^{4}$ | 7.3 | 0/100 |
| C | 1 | 0.83 | 0.18   $5 \times 10^{3}$ | 2.7 | 0/100 |
| D | 1 | 1.10 | 0.37   $2 \times 10^{4}$ | 1.5 | 0/100 |
| E | 1 | 1.65 | 0.37   $4 \times 10^{3}$ | 0.9 | 0/100 |
| F | 1 | 1.65 | 1.10   $8 \times 10^{3}$ | 0.5 | 0/100 |
| G | 1 | 2.20 | 0.37   deposition of black powder | | |
| H | 1 | 1.10 | 1.47   oily shine | | |

* In B through F, no deposition of black powder or no oily shine

As shown in Table 1, the board samples A to F show lower on-board dust amounts than the non-treated board, indicating higher antifouling properties. Among these, the board samples C to F show 1/10 or less of the on-board dust amounts than the non-treated board, indicating very high antifouling properties. The board samples D, E, and F show as high antifouling properties as the board sample A prepared according to Patent Literature 1. This indicates that antifouling film 3 with high antifouling properties can be obtained from antifouling coating material 2 containing 1 part by weight of UCA modified PO 4; not less than 0.83 parts by weight of carbon black particles 5; and not less than 0.18 parts by weight of fluororesin 6. The board samples B to F have surface resistivities of $4 \times 10^{3}$ Ω/sq to $2 \times 10^{4}$ Ω/sq, indicating higher conductivities than the non-treated board and the board sample A.

When the surface of the board sample G was wiped with paper, the paper was blacked, indicating deposition of black powder. This means that the content of carbon black particles 5 was very high so that carbon black particles 5 were deposited from film surface 3a of antifouling film 3.

The board sample H had sticky oil spots afloat on its surface, making it impossible to evaluate its antifouling properties. This means that the content of fluororesin 6 was very high so that components of fluororesin 6 seeped to film surface 3a of antifouling film 3. From this result, it has been found that antifouling film 3 with no deposition of black powder or no oily shine can be obtained from antifouling coating material 2 containing 1 part by weight of UCA modified PO 4; not more than 1.65 parts by weight of carbon black particles 5; and not more than 1.10 parts by weight of fluororesin 6.

Furthermore, to evaluate closely bound between antifouling film 3 and base 1, a cross-cut adhesion test was performed as follows. Eleven lines 1 mm apart were cut on antifouling film 3 into a depth reaching base 1 with a razor blade, and another eleven lines 1 mm apart were cut into the same depth to intersect the former eleven lines at right angles, thus forming a grid of 100 squares. Then, Scotch tape was firmly applied to the grid and then peeled off. It was considered that the smaller the number of squares peeled off with the Scotch tape from the base, the higher the contact. As shown in Table 1, in the board samples B to F, the number of peeled squares in the cross-cut adhesion test was 0 out of 100, indicating high contact with the base.

The following is a description of how to prepare evaluation samples of air blower blades 7 coated with antifouling film 3. As shown in FIG. 2, air blower blades 7 are sirocco blades made of a polypropylene resin. Antifouling coating material 2 was applied to air blower blades 7 by the following method: air blower blades 7 were soaked in antifouling coating material 2, placed in rotating device 8, and rotated to shake off surplus liquid 9 of antifouling coating material 2. This method allows antifouling coating material 2 to be applied in uniform thickness to blade surfaces 7a of air blower blades 7. This method also allows surplus liquid 9 of antifouling coating material 2 to be recovered and reused. Alternatively, however, antifouling coating material 2 can be applied to air blower blades 7 by spraying, brushing, or other methods.

Air blower blades 7 coated with antifouling coating material 2 were placed in oven 10, and dried at 80° C. In order to establish a firm contact between UCA modified PO 4 and air blower blades 7 so as to improve closely bound between antifouling film 3 and air blower blades 7, air blower blades 7 should be heated to 60° C. or more. Finally, antifouling film 3 containing UCA modified PO 4, carbon black particles 5, and fluororesin 6 was formed on air blower blades 7.

The evaluated samples of air blower blades 7 were the following three: non-treated air blower blades having no coating on blade surfaces 7a; an air-blower-blade sample A coated with the coating film of Patent Literature 1; and an air-blower-blade sample B coated with antifouling film 3 of the exemplary embodiment of the present invention.

The air-blower-blade sample A was prepared by soaking air blower blades 7 in the coating solution used in Patent Literature 1, taking them out of the coating solution, placing them in oven 10, and drying them at 80° C. The air-blower-blade sample B was prepared by soaking air blower blades 7 in antifouling coating material 2 made by mixing the chlorinated PP aqueous solution, the CB aqueous solution, and the fluororesin aqueous solution; rotating air blower blades 7 to shake off surplus liquid 9; placing them in oven 10, and drying them at 80° C. As described above, antifouling film 3 coated on air blower blades 7 of air-blower-blade sample B contains UCA modified PO 4, carbon black particles 5, and fluororesin 6. Antifouling film 3 contains UCA modified PO 4, carbon black particles 5, and fluororesin 6 in a weight ratio of 1:1.10:0.37. This composition is the same as the board sample D used in the on-board remaining dust test.

Figure 3:
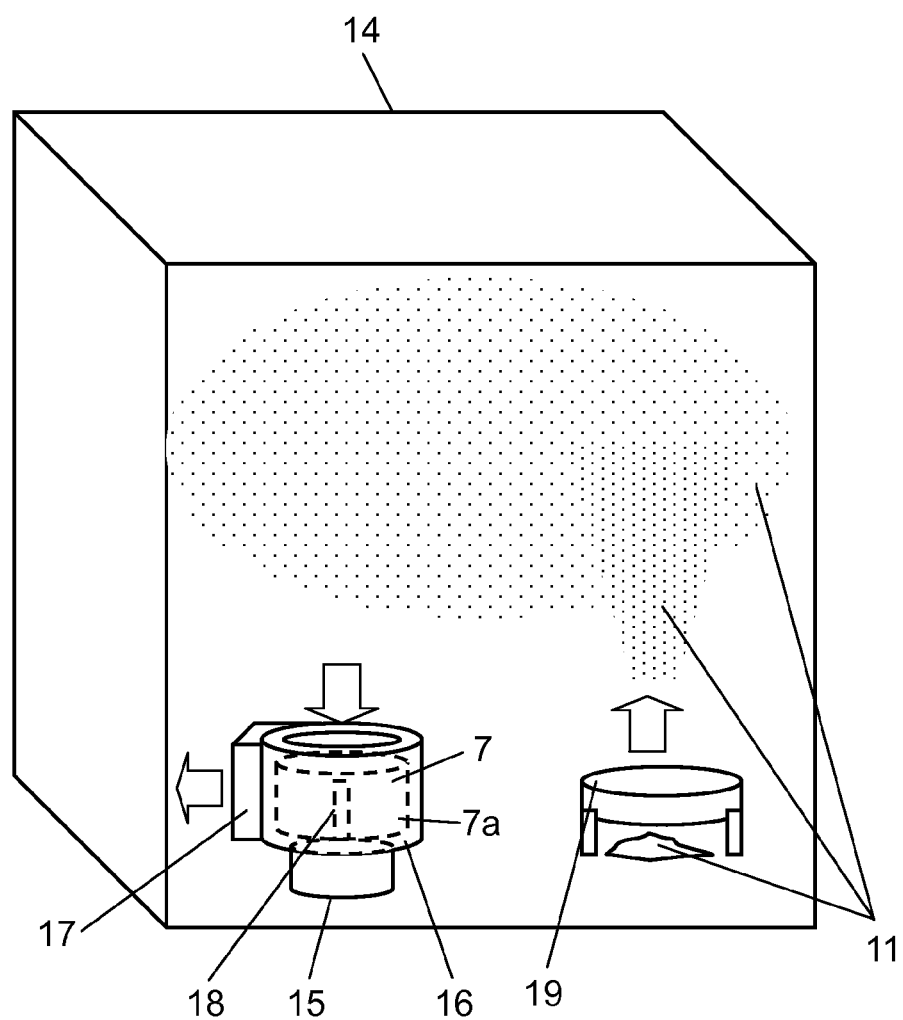
FIG. 3 shows how a dust-on-blade test is given to the air blower blades coated with the antifouling film.

Furthermore, in order to evaluate how antifouling film 3 of the exemplary embodiment of the present invention can reduce contaminants on blower blades, a dust-on-blade test shown in FIG. 3 was performed as follows. FIG. 3 shows how the dust-on-blade test is given to the air blower blades coated with the antifouling film of the exemplary embodiment of the present invention. The dust-on-blade test evaluated the amount of dust 11 attached to air blower blades 7 when air blower blades 7 blew off air containing dust 11 according to the following procedure.

Test blower 17 having motor 15 and casing 16 was placed in sealed test box 14 of 0.5 cubic meters. In addition, air blower blades 7 as a sample were placed in axis of rotation 18 of motor 15. Next, 10 g of JIS Test Powders, class 5 used as dust 11 was raised by dust-raising blower 19 and sprinkled in test box 14. After test blower 17 was operated for five minutes, air blower blades 7 were taken off and weighed. Based on the measured weight, the dust accumulation rate was calculated as follows: (the increase in the weight of air blower blades 7/the original weight of air blower blades 7×100%).

After the weight measurement, air blower blades 7 were washed with water to remove dust 11 attached to blade surfaces 7a, and were dried. Thus, the dust-on-blade test was repeated on air blower blades 7. More specifically, the washing of air blower blades 7 with water was performed 15 times (the air-blower-blade sample B) corresponding to 15 years on the assumption that they are washed once a year. The results of the dust-on-blade test are shown in FIG. 4.

Figure 4:
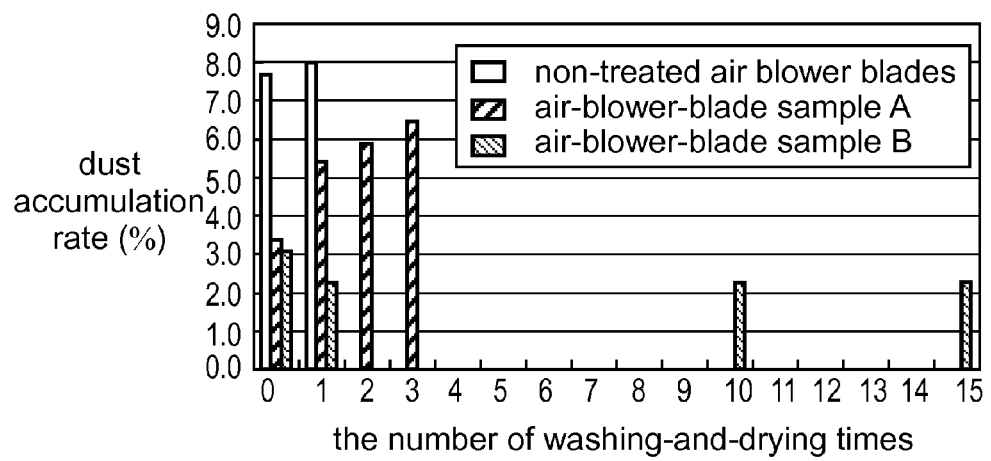
FIG. 4 shows results of the dust-on-blade test given to the air blower blades coated with the antifouling film.

FIG. 4 shows the results of the dust-on-blade test given to the air blower blades coated with the antifouling film of the exemplary embodiment of the present invention. As shown in FIG. 4, the dust accumulation rates when the number of washing-and-drying times was zero were as follows: 7.7% (no large difference from 8.0% obtained when the number of washing-and-drying times was 1) in the non-treated air blower blades; 3.3% in the air-blower-blade sample A; and 3.1% in the air-blower-blade sample B. These results indicate that the air blower blade samples A and B have high antifouling properties.

When the air-blower-blade sample A was subjected to 1, 2, and 3 times of washing and drying, the dust accumulation rate was increased, namely to 5.4%, 5.9%, and 6.5%, respectively. This indicates that the coating film eluted while being washed with water, gradually decreasing its antifouling properties. In contrast, when the air-blower-blade sample B was subjected to 1, 10, and 15 times of washing and drying, the dust accumulation rate was kept low, namely at 2.2%, 2.2%, and 2.3%, respectively. Thus, antifouling film 3 of the exemplary embodiment of the present invention maintains high antifouling properties even after 15 times of washing and drying, indicating not only high antifouling properties but also high durability against washing and drying.

Figure 5:
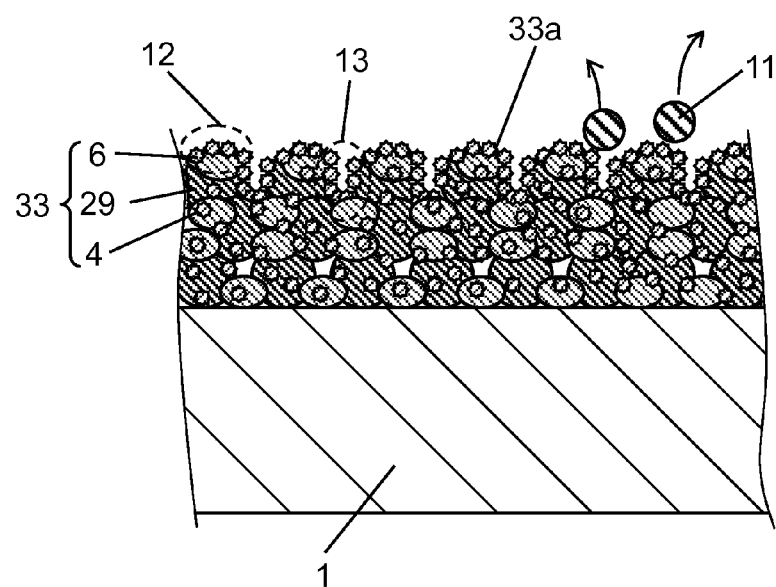
FIG. 5 is a partial sectional view of the antifouling film in which conductive particles have been replaced.

The following is a description of antifouling film 33 in which antimony-doped tin oxide particles (hereinafter, ATO particles) 29 are used instead of carbon black particles 5 as conductive particles. FIG. 5 is a partial sectional view of the antifouling film in which conductive particles of the exemplary embodiment of the present invention have been replaced.

In order to evaluate the antifouling properties and conductivity of antifouling film 33 and the contact between antifouling film 33 and the base, antifouling coating material 32 was made by mixing an ATO-particle dispersion liquid in which ATO particles 29 having a central particle size of 20 nm are dispersed in water (manufactured by Ishihara Sangyo Kaisha, Ltd.), with the above-described chlorinated PP aqueous solution and fluororesin aqueous solution. Then, antifouling coating material 32 was applied to the polypropylene board, and dried at 80° C. As a result, antifouling film 33 containing UCA modified PO 4, ATO particles 29, and fluororesin 6 in a weight ratio of 1:1.1:0.37 was coated on polypropylene board. The board sample coated with antifouling film 33 is referred to as a board sample I, whose surface resistivity and on-board dust amount were evaluated and shown in Table 2.

TABLE 2

| board sample | the weight ratio of antifouling film components (—) | | | surface resistivity ($\Omega$/sq) | on-board remaining dust (mg) | the number of peeled squares |
| --- | --- | --- | --- | --- | --- | --- |
| | UCA modified PO 4 | ATO particles | fluororesin 6 | | | |
| I | 1 | 1.10 | 0.37 | $7 \times 10^6$ | 2.7 | 2/100 |

As shown in Table 2, the board sample I had a surface resistivity of $7 \times 10^6$ $\Omega$/sq, and an on-board dust amount of 2.7 mg, indicating sufficient antifouling properties and required conductivity. As a result of the above-described cross-cut adhesion test, the number of peeled squares was 2 out of 100, indicating reasonably high contact between antifouling film 3 and the base.

ATO particles 29 is a composite oxide of tin, a group 4B element and antimony, a group 5B element, with one electron left per unit crystal. This electron travels in the crystal, thereby providing conductivity. Since the number of electrons that can move within a unit crystal is only one, the conductivity is not so high as those of a metal having free electrons or carbon black particles 5 having a large number of electrons not covalently bonded. Even so, ATO particles 29 can provide antifouling film 33 with conductivity high enough to dissipate electric charges accumulated on film surface 33a of antifouling film 33.

Since ATO particles 29 are blue, antifouling film 33 is nearly transparent pale blue. As a result, antifouling film 33 has high antifouling properties without spoiling the color tone of the base.

As the conductive particles, it is preferable to use carbon black particles 5 or ATO particles 29 as described above. Alternatively, it is possible to use a metal oxide such as tin oxide or zinc oxide. Carbon black particles 5 provide high conductivity, whereas ATO particles 29 provide transparency that does not spoil the color tone of the base.

Figure 6:
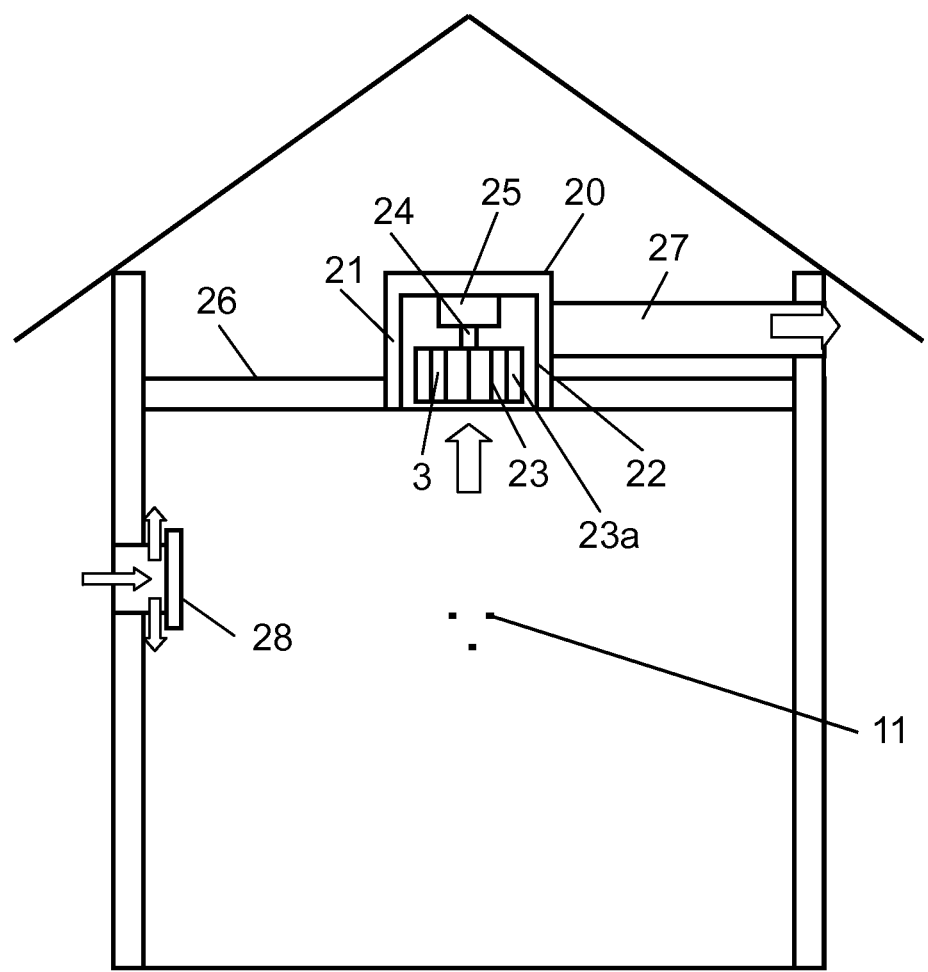
FIG. 6 is a configuration of an air blower provided with the antifouling film.
Figure 7:
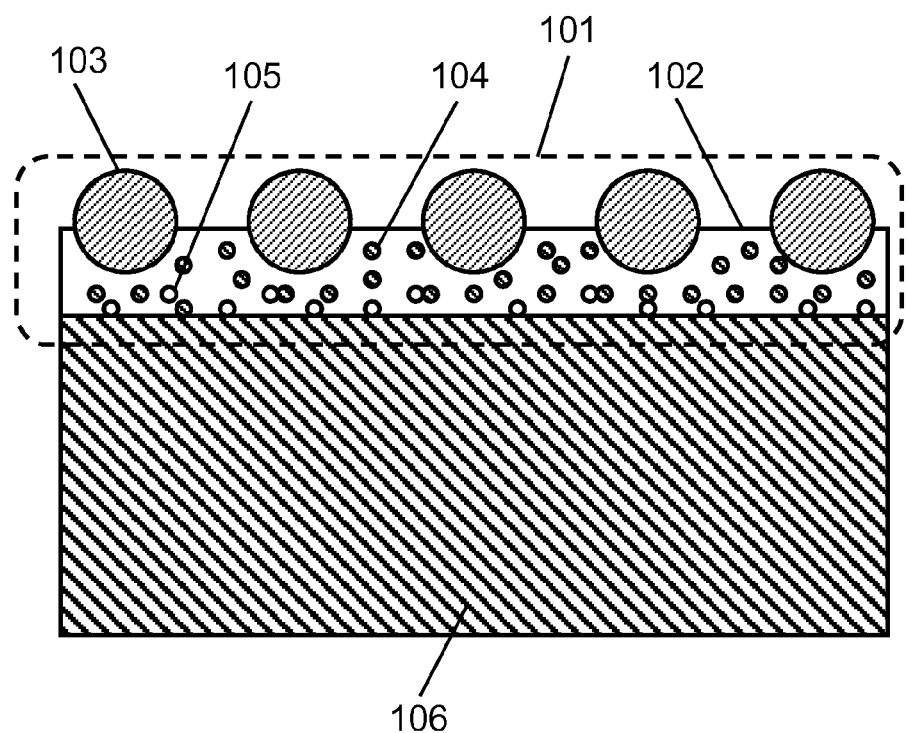
FIG. 7 is a configuration of a coating film as a conventional antifouling film.

FIG. 6 is a configuration of an air blower provided with the antifouling film of the exemplary embodiment of the present invention. In FIG. 6, ventilation fan 20 is an example of an air blower having air blower blades 23 whose blade surfaces 23a are coated with antifouling film 3. Ventilation fan 20 includes body frame 21, casing 22, air blower blades 23, and motor 25. Body frame 21 is fixedly attached, for example, to a beam behind ceiling 26. Casing 22 is accommodated in body frame 21 to generate airflow in cooperation with air blower blades 23. Air blower blades 23, which have blade surfaces 23a coated with antifouling film 3, are rotated by motor 25. Motor 25 is attached to the axis of rotation 24 so as to rotate air blower blades 23.

Ventilation fan 20 is fitted in ceiling 26, and connected to air duct 27 to exhaust air to the outdoors. Ventilation fan 20 draws in indoor air and exhausts it to the outdoors, whereas natural air supply opening 28 introduces outdoor air, thereby ventilating the room.

When ventilation fan 20 draws in the indoor air, dust 11 contained in the indoor air is attached to air blower blades 23 and contaminates them. Dust 11 also clogs the space between air blower blades 23, thereby deteriorating air blowing performance. However, to avoid this problem, blade surfaces 23a of air blower blades 23 are coated with antifouling film 3, which prevents dust 11 from being attracted, attracted, or adhered. Thus, ventilation fan 20 is prevented from being contaminated, thereby preventing the air blowing performance from decreasing.

Air blower blades 23 are configured to be removed from axis of rotation 24 and to be washed with water, and can maintain high antifouling properties even after washing. In the above-described ventilation fan 20, antifouling film 3 is applied only to air blower blades 23. Alternatively, antifouling film 3 can be applied to all parts that can come into contact with dust 11 when air flows, such as casing 22 and an air intake grill. This prevents ventilation fan 20 from being contaminated, thereby preventing the air blowing performance from decreasing.

Ventilation fan 20 described in the exemplary embodiment of the present invention is a type to exhaust indoor air to the outdoors; however, a similar effect can be obtained by ventilation fan 20 of the type to draw outdoor air into the room.

Ventilation fan 20 described in the exemplary embodiment of the present invention is a type to be fitted into a ceiling; however, a similar effect can be obtained by ventilation fan 20 of the type to be fitted into a wall facing the outdoors.

Furthermore, a similar effect can be obtained, for example, by a ceiling fan whose maintenance such as cleaning is difficult.

INDUSTRIAL APPLICABILITY

As described above, the antifouling film of the present invention is expected to be applicable to air blower blades, air intake grills, and air ducts of ventilation fans, ceiling fans, air purifiers, air conditioners.

REFERENCE MARKS IN THE DRAWINGS 1 base
2, 32 antifouling coating material
3, 33 antifouling film
3a, 33a film surface
4 unsaturated carboxylic acid-modified polyolefin resin (UCA modified PO)
5 carbon black particles
5a particle surface
6 fluororesin
7, 23 air blower blade
7a, 23a blade surface
8 rotating device
9 surplus liquid
10 oven
11 dust
12 projection portion
13 recess portion
14 test box
15 motor
16 casing
17 test blower
18 axis of rotation
19 dust-raising blower
20 ventilation fan
21 body frame
22 casing
24 axis of rotation
25 motor
26 ceiling
27 air duct
28 natural air supply opening
29 antimony-doped tin oxide particles (ATO particles)

The invention claimed is:

1. An antifouling film coated on a base, and comprising a binder component, conductive particles, and a fluororesin, wherein
    the conductive particles are bound together by the binder component;
    the binder component is closely bound to the base; and
    the antifouling film has a surface comprising the conductive particles of which surfaces are covered with the fluororesin wherein
    the fluororesin is made of a mixture of a fluoroethylene-vinyl ether alternating copolymer resin and a perfluoro alkyl group-ethylene oxide copolymer.

2. The antifouling film of claim 1, wherein
    the conductive particles are either carbon black particles or antimony-doped tin oxide particles.

3. The antifouling film of claim 1, wherein
    the conductive particles have a diameter of 10 nm to 100 nm.

4. An air blower blade having a surface coated with the antifouling film of claim 1.

5. The air blower blade of claim 4 being made of a polypropylene resin.

6. An air blower comprising:
a motor; and
the air blower blade of claim 4 rotated by the motor.

7. An antifouling film coated on a base, and comprising a binder component, conductive particles, and a fluororesin, wherein
the conductive particles are bound together by the binder component;
the binder component is closely bound to the base; and
the antifouling film has a surface comprising the conductive particles of which surfaces are covered with the fluororesin wherein
the binder component is made of an unsaturated carboxylic acid-modified polyolefin resin.

8. The antifouling film of claim 7, containing:
0.83 to 1.65 parts by weight of the conductive particles;
0.18 to 1.10 parts by weight of the fluororesin; and
1 part by weight of the unsaturated carboxylic acid-modified polyolefin resin.

9. An antifouling coating material for obtaining the antifouling film of claim 7 by applying the material to the base followed by drying, the material comprising a solvent containing the unsaturated carboxylic acid-modified polyolefin resin, the conductive particles, and the fluororesin.

* * * * *